(12) United States Patent
Kohn et al.

(10) Patent No.: US 8,391,367 B1
(45) Date of Patent: Mar. 5, 2013

(54) HIGH PERFORMANCE CONTEXT-ADAPTIVE VIDEO PROCESSOR

(75) Inventors: Leslie D. Kohn, Saratoga, CA (US); Ellen M. Lee, Saratoga, CA (US); Benghan Lui, Santa Clara, CA (US)

(73) Assignee: Ambarella, Inc., Santa Clara, CA (US)

( * ) Notice: Subject to any disclaimer, the term of this patent is extended or adjusted under 35 U.S.C. 154(b) by 342 days.

(21) Appl. No.: 12/645,740

(22) Filed: Dec. 23, 2009

(51) Int. Cl.
*H04N 11/02* (2006.01)

(52) U.S. Cl. ........... 375/240.2; 375/240.23; 375/240.25; 375/240.26

(58) Field of Classification Search .................. 375/240; 382/248; 345/427
See application file for complete search history.

(56) References Cited

U.S. PATENT DOCUMENTS

| | | | | |
|---|---|---|---|---|
| 5,790,706 | A * | 8/1998 | Auyeung | 382/248 |
| 5,883,978 | A * | 3/1999 | Ono | 382/248 |
| 6,664,902 | B2 * | 12/2003 | Andrew et al. | 341/50 |
| 6,765,510 | B2 * | 7/2004 | Koyama et al. | 341/51 |
| 7,106,909 | B2 * | 9/2006 | Satoh et al. | 382/239 |
| 7,486,212 | B2 * | 2/2009 | Chen et al. | 341/67 |
| 2002/0131084 | A1 * | 9/2002 | Andrew et al. | 358/1.16 |
| 2008/0074426 | A1 * | 3/2008 | Stein et al. | 345/502 |
| 2009/0245672 | A1 * | 10/2009 | Lin et al. | 382/243 |
| 2011/0135004 | A1 * | 6/2011 | Joch et al. | 375/240.16 |

* cited by examiner

*Primary Examiner* — William C Vaughn, Jr.
*Assistant Examiner* — Luis M Perez Fuentes
(74) *Attorney, Agent, or Firm* — Christopher P. Maiorana, PC

(57) ABSTRACT

An apparatus comprising a transform circuit, a first coder circuit, a second coder circuit, and a memory circuit. The transform circuit may be configured to generate (i) one or more first coefficients in response to a sample signal when in a first mode and (ii) the sample signal in response to the first coefficients when in a second mode. The first coder circuit may be configured to generate (i) a first bitstream signal in response to one or more second coefficients when in the first mode and (ii) the second coefficients in response to the first bitstream signal when in the second mode. The second coder circuit may be configured to generate (i) a second bitstream signal in response to one or more third coefficients when in the first mode and (ii) the third coefficients in response to the second bitstream signal when in the second mode. The memory circuit may be configured to store the first coefficients, the second coefficients, and the third coefficients. The memory may be configured to allow the transform circuit, the first coder circuit, and the second coder circuit to operate independently.

19 Claims, 4 Drawing Sheets

HIGH PERFORMANCE CONTEXT-ADAPTIVE VIDEO PROCESSOR

FIELD OF THE INVENTION

The present invention relates to video processing generally and, more particularly, to a method and/or apparatus for implementing a high performance context-adaptive video processor.

BACKGROUND OF THE INVENTION

For a conventional H.264 video processor, the CABAC (or CAVLC) stage often creates a bottleneck for the encode or decode process. In a conventional H.264 codec, the entropy coder is connected directly to the transform function circuit. Since the transform function circuit represents a data path that may operate on multiple pixels or coefficients in parallel, performance can be scaled up by operating on a number of pixels in parallel. Performance for the entropy coder is harder to scale up because of the difficulty to parallelize operations across symbols (i.e., only one symbol can be decoded at a time). In addition, the complexity of CABAC and CAVLC encoding or decoding uses multiple clock cycles to process one symbol. CABAC in particular takes more than 2 clock cycles per symbol on average to process. The extra clock cycles place an upper bound on the maximum bit rate that can be practically supported in a given process technology which is often less than the desired amount. Although CABAC encoding/decoding provides more efficient compression than CAVLC encoding/decoding, CABAC encoding/decoding is slower than CAVLC encoding/decoding due to the complexity.

It would be desirable to resolve encoding and/or decoding bottlenecks to achieve a high performance system.

SUMMARY OF THE INVENTION

The present invention concerns an apparatus comprising a transform circuit, a first coder circuit, a second coder circuit, and a memory circuit. The transform circuit may be configured to generate (i) one or more first coefficients in response to a sample signal when in a first mode and (ii) the sample signal in response to the first coefficients when in a second mode. The first coder circuit may be configured to generate (i) a first bitstream signal in response to one or more second coefficients when in the first mode and (ii) the second coefficients in response to the first bitstream signal when in the second mode. The second coder circuit may be configured to generate (i) a second bitstream signal in response to one or more third coefficients when in the first mode and (ii) the third coefficients in response to the second bitstream signal when in the second mode. The memory circuit may be configured to store the first coefficients, the second coefficients, and the third coefficients. The memory may be configured to allow the transform circuit, the first coder circuit, and the second coder circuit to operate independently.

The objects, features and advantages of the present invention include providing a video processor that may (i) provide high performance context-adaptive video processing (ii) provide high performance context-adaptive video processing; (iii) implement two entropy coders to resolve potential performance bottleneck issues, potentially doubling system performance; (iv) store coefficients in a memory between the transform and entropy coders to balance the load between two processing units across frames; (v) allow one coder to operate in decode mode and one to operate in encode mode to provide more flexibility; and/or (vi) improve performance in transcoding of full duplex scenarios.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may implement two (or more) instances of CAVLC/CABAC coders that may be decoupled from a transform stage to improve performance and/or resolve potential bottlenecks. Each CAVLC/CABAC coder may operate independently from the transform stage. In one example, both coders may encode two different pictures at the same time when the transform stage is encoding another picture. In another example, both coders may decode two different pictures at the same time when the transform stage is decoding another picture. In another example, one coder may encode one picture, while the other coder may be decoding another picture, independently of whether the transform stage is encoding or decoding a different picture.

Figure 1:
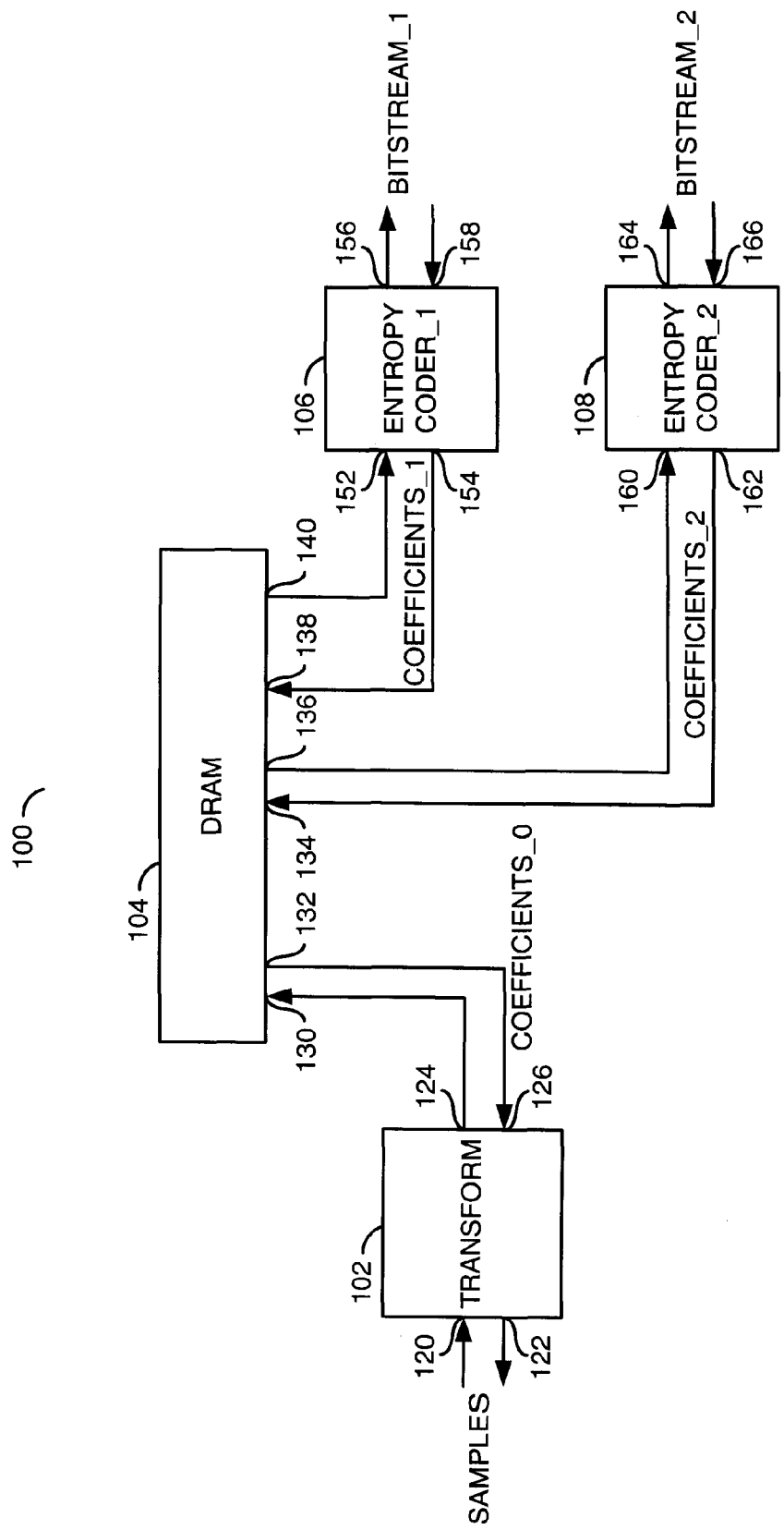
FIG. 1 is a block diagram of a video processor in accordance with the present invention.

Referring to FIG. 1, a block diagram of a circuit 100 is shown in accordance with an embodiment of the present invention. The circuit 100 may be implemented as a video processor circuit. The circuit 100 generally comprises a block (or circuit) 102, a block (or circuit) 104, a block (or circuit) 106 and a block (or circuit) 108. The circuit 102 may be implemented as a transform function circuit. The circuit 104 may be implemented as a memory circuit. In one example, the circuit 104 may be implemented as a DRAM memory circuit. In one example, the circuit 104 may be implemented as one or more memory circuits (or modules). The circuit 106 may be implemented as a coding circuit. The circuit 108 may also be implemented as a coding circuit. The circuit 102, the circuit 106 and the circuit 108 have been described as blocks (or circuits). However, the circuit 102, the circuit 106 and/or the circuit 108 may be implemented as hardware, software, or a combination of hardware and/or software.

The circuit 102 may have an input 120, an output 122, an output 124, and an input 126. The input 120 may receive the signal SAMPLES. The output 124 may present the signal COEFFICIENTS_0. The output 122 may present the signal SAMPLES. The input 126 may receive the signal COEFFICIENTS_0.

The circuit 104 may have an input 130, an output 132, an input 134, an output 136, an input 138, and an output 140. The input 130 may receive the signal COEFFICIENTS_0. The output 132 may present the signal COEFFICIENTS_0. The input 134 may receive the signal COEFFICIENTS_2. The output 136 may present the signal COEFFICIENTS_2. The input 138 may receive the signal COEFFICIENTS_1. The output 140 may present the signal COEFFICIENTS_1.

The circuit 106 may have an input 152, an output 154, an output 156 and an input 158. The input 152 may receive the signal COEFFICIENTS_1 when the coder 106 is in the encode mode. The output 154 may present the signal COEF- FICIENTS_1 when the coder 106 is in the decode mode. The output 156 may present the signal BITSTREAM_1 when the coder 106 is in the encode mode. The input 158 may receive the signal BITSTREAM_1 when the coder 106 is in the decode mode.

The circuit 108 may have an input 160, an output 162, an output 164, and an input 166. The input 160 may receive the signal COEFFICIENTS_2 when the coder 108 is in the encode mode. The output 162 may present the signal COEFFICIENTS_2 when the coder 108 is in the decode mode. The output 164 may present the signal BITSTREAM_2 when the coder 108 is in the encode mode. The input 166 may receive the signal BITSTREAM_2 when the coder 108 is in the decode mode.

The transform function circuit 102 may convert the input signal SAMPLES to/from the signal COEFFICIENTS_0 when in a respective encode mode or decode mode. The signal SAMPLES may represent a number of video picture samples. The signal COEFFICIENTS_0 may represent one or more quantized coefficients. The transform circuit 102 may convert from a spatial domain to a frequency domain. Alternately, the transform circuit 102 may convert quantized coefficients (e.g., the frequency domain) to picture samples (e.g., the spatial domain). The memory circuit 104 may be used as storage for the signal COEFFICIENTS_0 (e.g., quantized coefficients). The entropy coder circuit 106 may be used to convert the signal COEFFICIENTS_1 to/from the signal BITSTREAM_1. The signal COEFFICIENTS_1 may represent a number of quantized coefficients.

Figure 2:
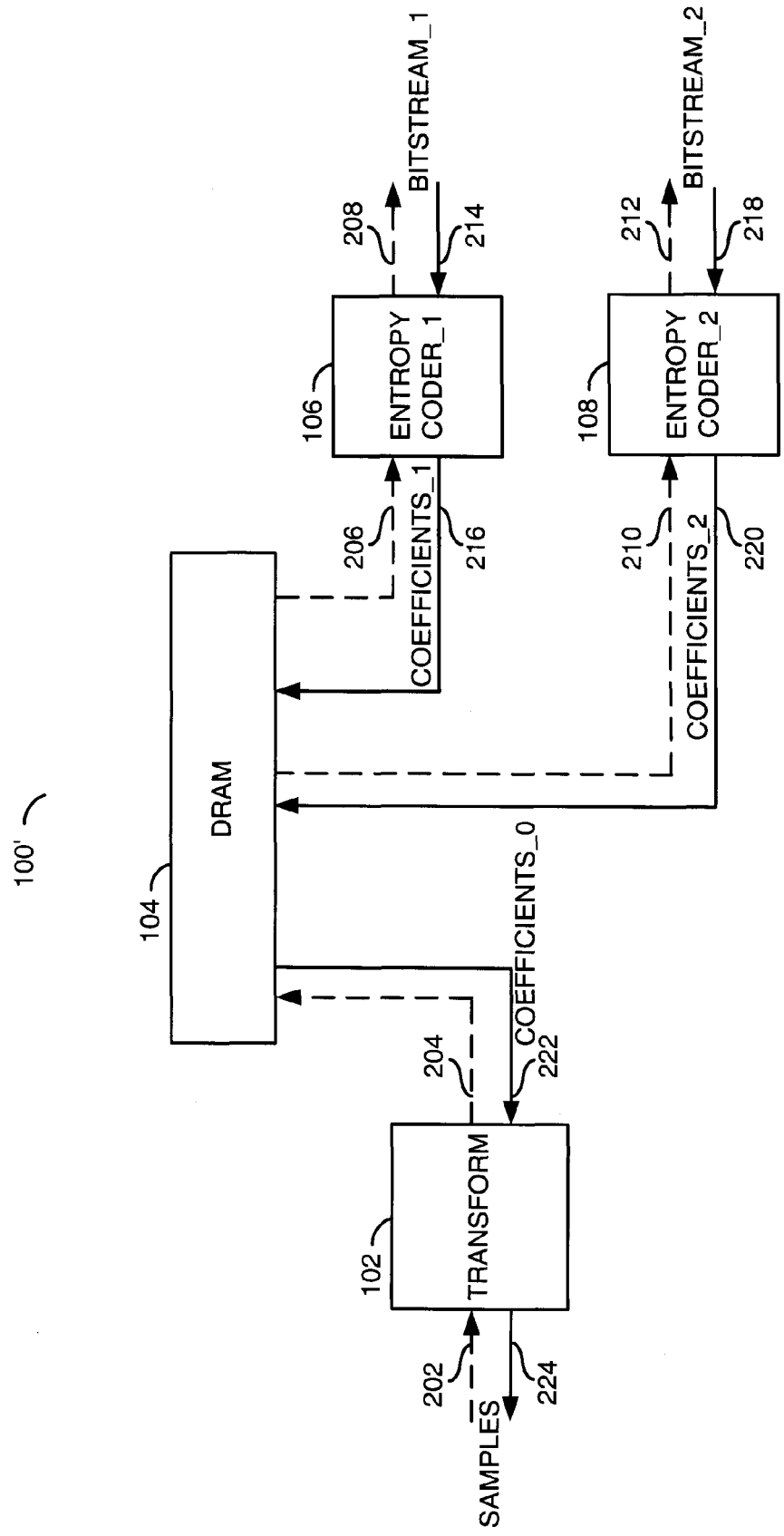
FIG. 2 is a more detailed block diagram of the video processor of FIG. 1 illustrating an encode path and a decode path.

Referring to FIG. 2, a more detailed diagram of the video processor 100' is shown. FIG. 2 illustrates data flow in the encode mode and decode mode. A number of encode paths 202, 204, 206, 208, 210, and 212 are shown as dash lines. A number of decode paths 214, 216, 218, 220, 222, and 224 are shown as solid lines. Since the memory 104 may be used to store the signals COEFFICIENTS_0, COEFFICIENTS_1, and COEFFICIENTS_2, the transform circuit 102, the coder circuit 106 and the coder circuit 108 may operate independently. For example, the transform circuit 102 may encode or decode while the coder circuit 106 and the coder circuit 108 may encode or decode.

Figure 3:
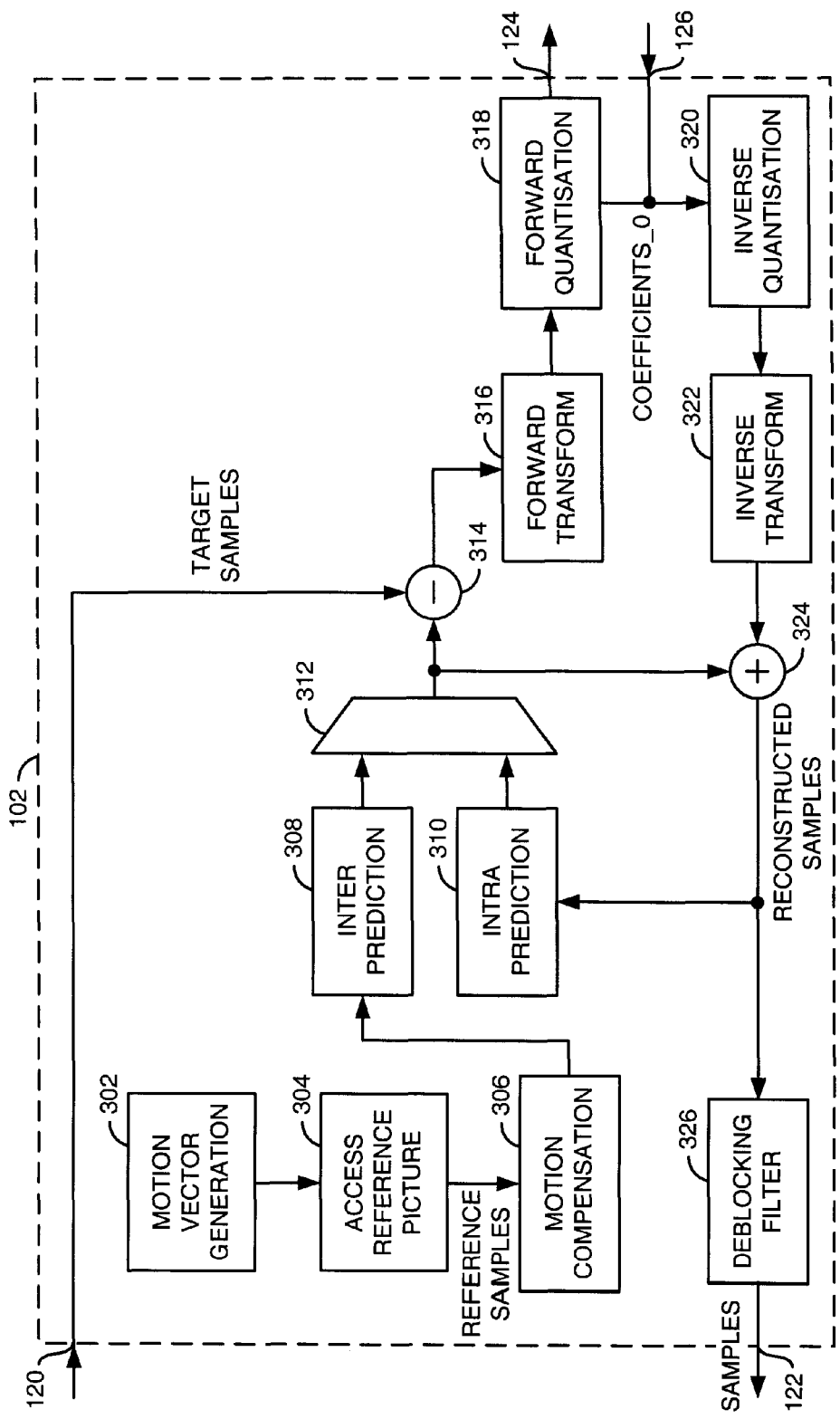
FIG. 3 is a schematic block diagram of a transform function.

Referring to FIG. 3, a block diagram of the transform function circuit 102 is shown. The circuit 102 generally comprises a block (or circuit) 302, a block (or circuit) 304, a block (or circuit) 306, a block (or circuit) 308, a block (or circuit) 310, a block (or circuit) 312, a block (or circuit) 314, a block (or circuit) 316, a block (or circuit) 318, a block (or circuit) 320, a block (or circuit) 322, a block (or circuit) 324, and a block (or circuit) 326. The circuit 302 may be implemented as a motion vector generation circuit. The circuit 304 may be implemented as an access reference picture circuit. The circuit 306 may be implemented as a motion compensation circuit. The circuit 308 may be implemented as an Inter prediction circuit. The circuit 310 may be implemented as an Intra prediction circuit. The circuit 312 may be implemented as a multiplexer circuit. The circuit 314 may be implemented as a subtraction circuit. The circuit 316 may be implemented as a Forward Transform circuit. The circuit 318 may be implemented as a Forward Quantizer circuit. The circuit 320 may be implemented as an Inverse Quantizer circuit. The circuit 322 may be implemented as an inverse transform circuit. The circuit 324 may be implemented as an addition circuit. The circuit 326 may be implemented as a Deblocking Filter circuit. The transform circuit 102 normally performs the majority of the encoding and/or decoding functions, with the exception of entropy coding/decoding, which is normally performed by the coder 106 and/or the coder 108.

Figure 4:
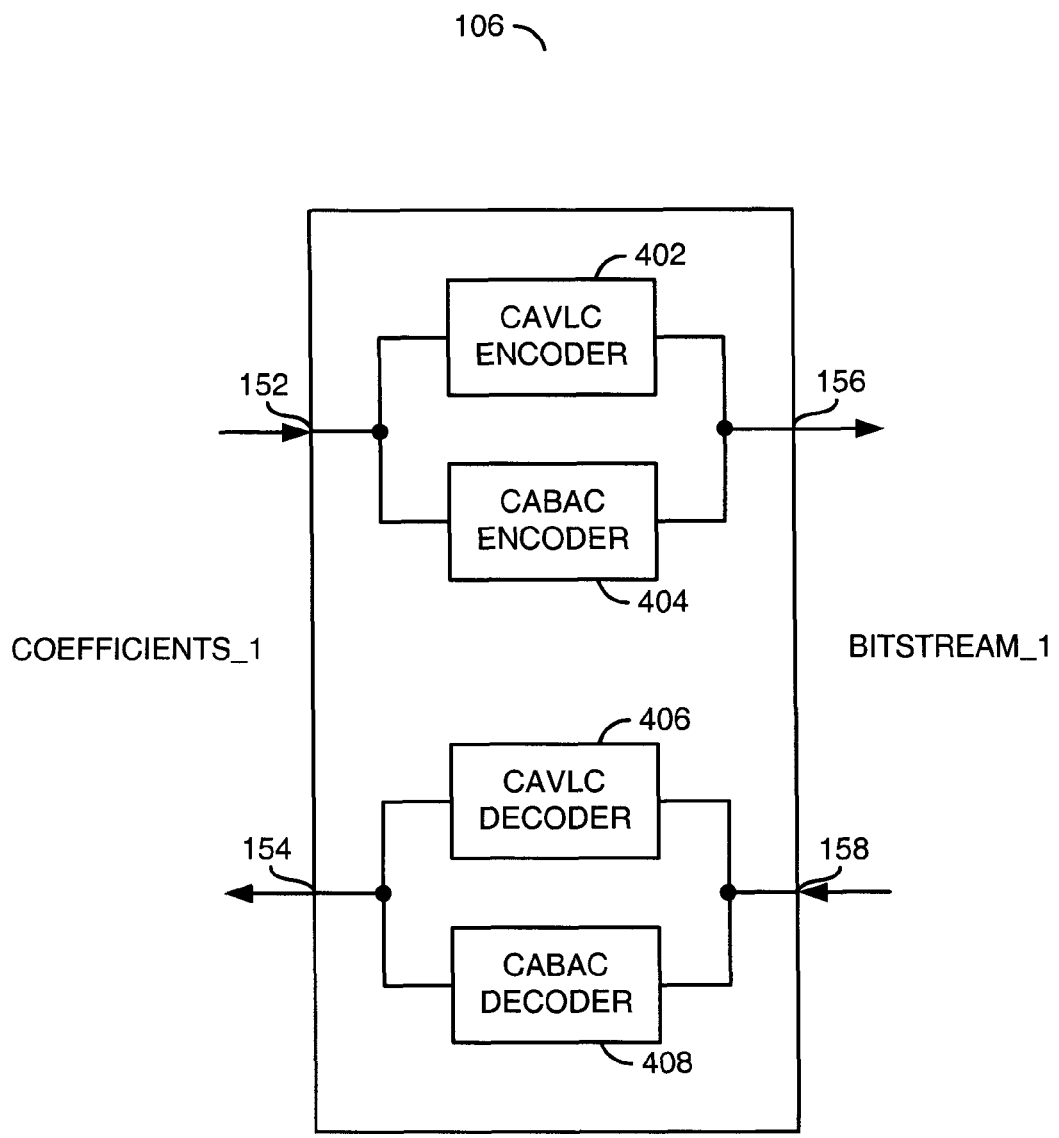
FIG. 4 is a schematic block diagram of a entropy coder.

Referring to FIG. 4, a diagram of the entropy coder circuit 106 (or 108) is shown. The circuit 106 generally comprises a block (or circuit) 402, a block (or circuit) 404, a block (or circuit) 406, and a block (or circuit) 408. The circuit 402 may be implemented as a CAVLC encoder (Context-Adaptive Variable Length Coding). The circuit 404 may be implemented as a CABAC (Context-Adaptive Binary Arithmetic Coding) encoder. The circuit 406 may be implemented as a CAVLC decoder (Context-Adaptive Variable Length Coding). The circuit 408 may be implemented as a CABAC (Context-Adaptive Binary Arithmetic Coding) decoder.

The encoders 402 and 404 generally convert the signal COEFFICIENTS_1 (e.g., the signal Quantized Coefficients) into the signal BITSTREAM_1. The decoders 406 and 408 generally convert the signal BITSTREAM_1 into the signal COEFFICIENTS_1. While the coder 106 has been described, the coder 108 may have a similar implementation.

The coder 106 and the coder 108 may each be implemented as an H.264 compliant entropy coder. The coder 106 and the coder 108 may contain either a CAVLC block 402 (or 406), a CABAC block 404 (or 408), or both a CAVLC and a CABAC block. In one example, the Context Adaptive Variable Length Coding encoder 402 may be used to map input symbols to a series of variable length code words. Each code word may contain an integer number of bits. Frequently occurring symbols may be represented with short VLCs. Less common symbols may be represented with long VLCs. Over a sufficiently large number of encoded symbols, the VLCs lead to compression of data. Context Adaptive generally refers to using local spatial and/or temporal characteristics to decide how a symbol is coded.

In one example, the Context Adaptive Binary Arithmetic Coding encoder 404 may convert a sequence of data symbols into a single fractional number. An optimal fractional number of bits may be used to represent each symbol. Arithmetic coding may more closely approach theoretical maximum compression ratios. The principal advantage of arithmetic coding occurs when the transmitted number is not constrained to an integer number of bits for each transmitted symbol. Context adaptive normally refers to local spatial and/or temporal characteristics that may be used to decide how a symbol is coded. Compared to BAC, compression efficiency of VLC is poor for symbols with probabilities greater than 0.5, since the best compression that may be achieved occurs by representing these symbols with a single bit code.

The transform function circuit 102 may implement the following operations (or steps) during the encode mode:

1) The motion vector generation circuit 302 may generate motion vectors based on differences between a reference picture and a target picture;

2) the access reference picture circuit 304 may generate the signal REFERENCE_SAMPLES based on the motion vectors;

3) the perform motion compensation circuit 306 and the Inter-Prediction circuit 308 may operate on the signal REFERENCE_SAMPLES;

4) the select prediction circuit 312 may select between the Inter-Prediction circuit 308 and the Intra-Prediction circuit 310;

5) the subtract circuit 314 may subtract the signal TARGET_SAMPLES from the signal REFERENCE_SAMPLES received from the select prediction circuit 312;

6) the Forward Transform circuit 316 and the Forward Quantization circuit 318 may generate the signal COEFFICIENTS_0 (e.g., one or more quantized coefficients);

7) the signal COEFFICIENTS_0 may be presented to the Inverse Quantization circuit 320 and the inverse transform circuit 322;

8) the add circuit 324 may add the result of the inverse transform circuit 322 to the result of the select prediction circuit 312 to generate the signal RECONSTRUCTED_SAMPLES;

9) the signal RECONSTRUCTED_SAMPLES may be presented to the Intra Prediction circuit 310 and the Deblocking Filter Circuit 326; and 10) the result of the Deblocking Filter circuit 328 may be presented as the output signal SAMPLES to be displayed and used as a reference picture for later pictures.

During the decode mode, the above steps 1, 2, 3, 4, 7, 8, 9, and 10 may be applied with the motion vectors being determined from the bitstream.

To solve performance bottlenecks during encoding and/or decoding, the video processor circuit 100 uses entropy coder 106 and entropy coder 108, which doubles the effective performance. The transform function circuit 102, the entropy coder circuit 106 and the entropy coder circuit 108 are separated entities operating independently. The signal COEFFICIENTS_0 are stored in the memory circuit 104. This allows the entropy coder circuit 106 and the entropy coder circuit 108 to operate at the average bit rate for a sequence rather than the peak bit rate for a single macroblock without creating a performance bottleneck. The peak bit rate for a macroblock may be a factor of 30 higher than the maximum average bit rate for a sequence. In addition, the circuit 100 allows the entropy coder circuit 106 and the entropy coder circuit 108 to operate on different frames which is necessary to implement a parallel operation when there is a single slice per frame.

During encode mode, the signal SAMPLES from spatial domain is converted into frequency domain signal COEFFICIENTS_0, then stored into the memory circuit 104. The memory circuit 104 may also store macroblock header information and motion vector information, which may be coded by the entropy coder circuit 106 and/or the entropy coder circuit 108. The entropy coder circuit 106 and the entropy coder circuit 108 may encode the signal COEFFICIENTS_1 and the signal COEFFICIENTS_2 in parallel. The transform function circuit 102 may work on one picture while the entropy coder circuit 106 and the entropy coder circuit 108 are each independently working on different previously transformed pictures. The frame processing time of the entropy coder circuit 106 and the entropy coder circuit 108 may be different, depending on the complexity of each frame. The load may be balanced between the entropy coder circuit 106 and the entropy coder circuit 108 by having each coder start processing the oldest remaining transformed picture when the processing of a previous picture is complete.

In some embodiments where the different pictures are part of the same program content (e.g., a single program encode mode), BITSTREAM_1 and BITSTREAM_2 may be subsequently combined by a multiplex operation of the circuit 100 to establish an output bitstream. The output bitstream may appear to a standard decoder as if encoded by a single entropy coder circuit 106 or entropy coder circuit 108. In other embodiments where the different pictures are from different programs (e.g., a multiple program encode mode), the programs may be time shared in the signal SAMPLES, operated on by the transform function circuit 102 and stored in the memory circuit 104. Thus, BITSTREAM_1 and BITSTREAM_2 may by presented from the circuit 100 independent of each other since each carries a separately encoded program.

During decode mode, BITSTREAM_1 and BITSTREAM_2 from two different pictures may be processed at the same time by the entropy coder circuit 106 and the entropy coder circuit 108. Both decoded signals COEFFICIENTS_1 and COEFFICIENTS_2 of different pictures can be stored in the memory circuit 104. The memory circuit 104 may also store macroblock header information and motion vector information, which may be generated by the entropy coder circuit 106 and/or the entropy coder circuit 108. The macroblock header information and motion vector information stored in the memory circuit 104 is normally (i) generated from the coder circuit 106 or 108 when the coder circuit 106 or 108 is in decode mode (used by the transform circuit 102) and (ii) used by the coder circuit 106 or 108 when the coder circuit 106 or 108 is in the encode mode (generated from the transform circuit 102). At the same time, or substantially simultaneously, the transform function circuit 102 may work on the signal COEFFICIENTS_0 from the earlier decoded picture. The frame processing time of the entropy coder circuit 106 and the entropy coder circuit 108 may be different, depending on the complexity of each frame, but the load can be balanced between the entropy coder circuit 106 and the entropy coder circuit 108 by having each coder circuit start processing the oldest remaining undecoded picture when the processing of a picture is complete.

In some embodiments where the different pictures are part of the same program content (e.g., a single program decode mode), a parser operation of the circuit 100 may separate an input bitstream into BITSTREAM_1 and BITSTREAM_2 before reception at the entropy coder circuit 106 and the entropy coder circuit 108. After entropy decoding, the original picture sequence may be established in the signal COEFFICIENTS_0 as the coefficients are read from the memory circuit 104 to the transform function circuit 102. In other embodiments where the different pictures are from different programs (e.g., a multiple program decode mode), BITSTREAM_1 and BITSTREAM_2 may be separately received by the circuit 100, entropy decoded by the entropy coder circuit 106 and the entropy coder circuit 108, and the results stored in the memory circuit 104. The resulting coefficients may be time multiplex in the signal COEFFICIENT_0 to the transform function circuit 102 for additional processing in a time share manner.

During the encode/decode mode, the transform function circuit 102, the memory circuit 104 and one of the entropy coder circuits (e.g., 106) may encode an input program received at the input 120 to generate BITSTREAM_1. For example, see encode paths 202, 204, 206 and 208 in FIG. 2 In parallel, the other entropy coder circuit (e.g., 108), the memory circuit 104 and the transform function circuit 102 may decode BITSTREAM_2 to generate an output program at the output 122. For example, see decode paths 218, 220, 222 and 224 in FIG. 2. As such, the transform function circuit 102 may time share between encoding the input program and decoding the output program.

While two coder circuits 106 and 108 have been described, additional coders may be implemented. For example, three or more coders may be implemented. Additionally, while the two coder circuits have been described as having a similar implementation, additional implementations may be implemented. For example, one coder circuit may be configured to handle the majority of processing, while another coder circuit may be configured to handle less processing (e.g., a special case, high priority frames, etc.).

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a transform circuit configured to (i) generate and store in a memory one or more first coefficients in response to a sample signal when in a first mode and (ii) generate said sample signal in response to said first coefficients retrieved from said memory when in a second mode;
   a first coder circuit configured to (i) generate a first bitstream signal in response to one or more second coefficients retrieved from said memory when in said first mode and (ii) generate said second coefficients to be stored in said memory in response to said first bitstream signal when in said second mode; and
   a second coder circuit configured to (i) generate a second bitstream signal in response to one or more third coefficients retrieved from said memory when in said first mode and (ii) generate said third coefficients to be stored in said memory in response to said second bitstream signal when in said second mode, wherein said memory circuit is (i) coupled to said transform circuit, said first coder circuit and said second coder circuit, (ii) configured to store said first coefficients, said second coefficients, and said third coefficients, and (iii) configured to allow said transform circuit, said first coder circuit, and said second coder circuit to operate independently.

2. The apparatus according to claim 1, wherein said first mode of said transform circuit comprises an encode mode and said second mode of said transform circuit comprises a decode mode.

3. The apparatus according to claim 2, wherein said first mode of said first coder circuit and said first mode of said second coder circuit comprise an encode mode.

4. The apparatus according to claim 2, wherein said second mode of said first coder circuit and said second mode of said second coder circuit comprise a decode mode.

5. The apparatus according to claim 2, wherein said first coder circuit is configured to operate in said first mode and said second coder circuit is configured to operate in said second mode.

6. The apparatus according to claim 2, wherein said first coder circuit is configured to operate in said second mode and said second coder circuit is configured to operate in said first mode.

7. The apparatus according to claim 2, wherein said transform circuit is configured to operate in said first mode and said first coder circuit is configured to operate in said second mode.

8. The apparatus according to claim 2, wherein said transform circuit is configured to operate in said second mode and said first coder circuit is configured to operate in said first mode.

9. The apparatus according to claim 2, wherein said transform circuit is configured to operate in said first mode and said second coder circuit is configured to operate in said second mode.

10. The apparatus according to claim 2, wherein said transform circuit is configured to operate in said first mode and said second coder circuit is configured to operate in said first mode.

11. The apparatus according to claim 1, wherein said first bitstream and said second bitstream are (i) combined into an output bitstream when in a first mode and (ii) remain independent when in a second mode.

12. The apparatus according to claim 1, wherein (i) said first coder circuit is configured to encode while said second coder circuit is simultaneously configured to decode.

13. The apparatus according to claim 1, wherein said memory circuit is configured to store macroblock header information and motion vector information generated by said first coder circuit and said second coder circuit.

14. The apparatus according to claim 1, wherein said memory comprises a Dynamic Random Access Memory (DRAM).

15. The apparatus according to claim 1, wherein said memory comprises a plurality of Dynamic Random Access Memory (DRAM) modules.

16. An apparatus comprising:
    a transform circuit configured to (i) generate and store in a memory one or more first coefficients in response to a sample signal when in a first mode and (ii) generate said sample signal in response to said first coefficients retrieved from said memory when in a second mode;
    first means for (i) generating a first bitstream signal in response to one or more second coefficients retrieved from said memory when in said first mode and (ii) generating said second coefficients to be stored in said memory in response to said first bitstream signal when in said second mode; and
    second means for (i) generating a second bitstream signal in response to one or more third coefficients retrieved from said memory when in said first mode and (ii) generating said third coefficients to be stored in said memory in response to said second bitstream signal when in said second mode, wherein (i) said memory is coupled to said first and second means for generating and to said transform circuit, (ii) said memory allows said first and second means for generating and said transform circuit to operate independently and (iii) said memory stores said first coefficients, said second coefficients and said third coefficients.

17. A method for processing video comprising the steps of:
(A) using a transform circuit to (i) generate and store in a memory one or more first coefficients in response to a sample signal when in a first mode and (ii) generate said sample signal in response to said first coefficients retrieved from said memory when in a second mode;
(B) (i) generating a first bitstream signal in response to one or more second coefficients retrieved from said memory when in said first mode and (ii) generating said second coefficients to be stored in said memory in response to said first bitstream signal when in said second mode;
(C) (i) generating a second bitstream signal in response to one or more third coefficients retrieved from said memory when in said first mode and (ii) generating said third coefficients to be stored in said memory in response to said second bitstream signal when in said second mode; and
(D) storing said first coefficients, said second coefficients, and said third coefficients in said memory, wherein (i) said method allows step (A), step (B) and step (C) to operate independently and (ii) said method generates said first and second bitstream both in response to said transform circuit.

18. The method according to claim 17, wherein said first mode of step (A) comprises an encode mode and said second mode of said step (B) comprises a decode mode.

19. The apparatus according to claim 1, wherein said first coder circuit is coupled to said transform circuit through said memory circuit and said second coder circuit is coupled to said transform circuit through said memory circuit.

* * * * *